United States Patent Office 3,167,519
Patented Jan. 26, 1965

---

3,167,519
POLYMERIZATION OF EPOXIDES
Fred N. Hill, South Charleston, and Frederick E. Bailey, Jr., and John T. Fitzpatrick, Charleston, W. Va., assignors to Union Carbide Corporation, a corporation of New York
No Drawing. Filed Dec. 29, 1958, Ser. No. 783,185
13 Claims. (Cl. 260—2)

This invention relates to a process for polymerizing epoxide compounds and to the products resulting therefrom.

This application is a continuation-in-part of application Serial No. 587,955, entitled "Polymerization of Epoxides and New Products Obtained Thereby," by F. E. Bailey, Jr., J. T. Fitzpatrick, and F. N. Hill, filed May 29, 1956, and assigned to the same assignee as the instant application.

In a broad aspect the instant invention is directed to the process for polymerizing an olefin oxide in contact with a catalytically significant quantity of metal amide catalyst described hereinafter to produce solid polymers, and to the products resulting from said process.

It is deemed appropriate at this time to define the term "reduced viscosity" since this term will be frequently employed throughout the specification. By the term "reduced viscosity," as used herein including the appended claims, is meant a value obtained by dividing the specific viscosity by the concentration of the polymer in the solution, the concentration being measured in grams of polymer per 100 milliliters of solvent at a given temperature, and it is regarded as a measure of molecular weight. The specific viscosity is obtained by dividing the difference between the viscosity of the solution and the viscosity of the solvent by the viscosity of the solvent. Unless otherwise indicated, the reduced viscosity value is determined at a concentration of 0.2 gram of polymer per 100 milliliters of solvent, i.e., acetonitrile, at 30° C.

Accordingly, one or more of the following objects will be achieved by the practice of this invention.

It is an object of this invention to provide a novel process for polymerizing olefin oxide in contact with a catalytically significant quantity of divalent metal amide catalyst described hereinafter. It is also an object of this invention to provide a novel process for polymerizing an admixture of two or more different olefin oxides in contact with a catalytically significant quantity of a divalent metal amide catalyst described hereinafter. It is another object of this invention to provide a novel process for polymerizing an admixture comprising greater than about 50 weight percent of a lower olefin oxide, preferably ethylene oxide, and less than about 50 weight percent of a different olefin oxide, based on the weight of the olefin oxide charge. A further object of this invention is to prepare solid polymers in accordance with the teachings herein set forth. A still further object of this invention is directed to the preparation of synthetically formed granular poly(ethylene oxide) discussed hereinafter in detail. A yet further object is directed to the preparation of solid copolymers, the properties and characteristics of which can be "tailor-made" to fit a wide variety of uses and fields of applications. Other objects will become apparent to those skilled in the art in the light of the instant disclosure.

As indicated previously, a broad aspect of this invention is directed to polymerizing olefin oxide in contact with certain divalent metal amide catalysts to produce solid polymers. A single olefin oxide or an admixture of at least two different olefin oxides can be employed as the monomeric feed.

The monomeric olefin oxides employed in the polymerization process of the invention have the following formula:

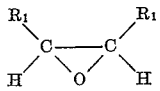

wherein each $R_1$, individually, can be hydrogen, haloaryl, or a hydrocarbon radical free from ethylenic and acetylenic unsaturation such as, for example, alkyl, aryl, cycloalkyl, aralkyl, or alkaryl radicals. In addition, both $R_1$ variables together with the epoxy carbon atoms, i.e., the carbon atoms of the epoxy group,

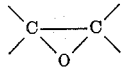

can represent a saturated cycloaliphatic hydrocarbon nucleus containing from 4 to 10 carbon atoms, preferably from 4 to 8 carbon atoms, for example, cycloalkyl, alkyl-substituted cycloalkyl, cyclobutyl, cyclopentyl, cyclohexyl, cycloheptyl, cyclooctyl, 2-methylcyclopentyl, 3-amylcyclohexyl, and the like. Illustrative $R_1$ radicals include, among others, methyl, ethyl, propyl, butyl, isobutyl, hexyl, isohexyl, 3-propylheptyl, dodecyl, octadecyl, phenyl, halophenyl, chlorophenyl, bromophenyl, benzyl, tolyl, ethylphenyl, butylphenyl, phenethyl, phenylpropyl, cyclopentyl, cyclohexyl, 2-methylcyclohexyl, cycloheptyl, and the like. It is preferred that a lower olefin oxide be employed as starting material in the homopolymerization reaction. In polymerizing an admixture comprising two different olefin oxides, it is also preferred that one of the olefin oxides be a lower olefin oxide. It is to be understood, also, that the term "lower olefin oxides" encompasses monomers such as ethylene oxide, propylene oxide, 1,2-epoxybutane, 2,3-epoxybutane, and the like.

Representative olefin oxide monomers which can be employed include, for example, ethylene oxide, propylene oxide, 1,2-butylene oxide, 2,3-butylene oxide, the epoxypentanes, the epoxyhexanes, 2,3-epoxyheptane, nonene oxide, 5-butyl-3,4-epoxyoctane, 1,2-epoxydodecane, 1,2-epoxyhexadecane, 1,2 - epoxyoctadecane, 5 - benzyl - 2,3 - epoxyheptane, 4-cyclohexyl-2,3-epoxypentane, chlorostyrene oxide, styrene oxide, ortho-, meta-, and paraethylstyrene oxide, glycidyl benzene, the oxabicycloalkanes and alkyl-substituted oxabicycloalkanes, e.g., 7-oxabicyclo[4.1.0]heptane, 6-oxabicyclo[3.1.0]hexane, 4-propyl-7-oxabicyclo[4.1.0]heptane, 3-amyl-6-oxabicyclo[3.1.0]hexane, and the like.

The polymerization reaction is effected in the presence of divalent metal amide catalysts, the metal portion of which has an atomic number greater than 11, preferably greater than 19, and less than 57 and is found in Group II of the Periodic Table of the Elements. These catalysts encompass the amides of magnesium, calcium, zinc, strontium, cadmium, and barium. The amides of the alkaline earth metals, i.e., strontium, barium, and calcium, are an exceptionally desirable catalyst subclass.

The preparation of the metal amides is well-known to the art. For instance, the metal hexammoniates can be prepared by reacting the appropriate metal with liquid ammonia, the resulting product being characterized by the formula $M(NH_3)_6$ wherein M can be calcium, strontium, barium, and the like. The alkaline earth metal amides can be obtained by allowing the corresponding metal hexammoniate to decompose while protecting them from reactive gases and/or vapors such as oxygen, water, and the like. The amides of zinc, cadmium, and barium can also be prepared by the reaction between potassium amide and the bromides of the appropriate metal, the reaction being carried out in liquid ammonia. The reaction of diethylzinc or diethylmagnesium with ammonia gives the corresponding metal amides and ethane as the products.

The articles of Bergstrom and Fernelius [1] also disclose various methods for preparing metal amides. The metal amides effective as catalysts in the polymerization reaction are characterized by the formula $H_2N$—M—$NH_2$ wherein M is magnesium, calcium, zinc, barium, cadmium, or strontium.

The catalytic activity of the metal amides is quickly destroyed upon exposure to air. The preparation and storage of the catalyst should be conducted under conditions in which water, oxygen, and other gases and/or vapors reactive with the metal, or the amides, are essentially excluded. Operations subsequent to the catalyst preparation should be carried out under an inert atmosphere free of gases which are reactive with the metal amides, e.g., in high purity nitrogen atmosphere. Many operations can be desirably carried out by suspending the catalyst in an inert liquid such as mineral oil, the diethyl ether of diethylene glycol, and the like.

The catalyst is employed in catalytically significant quantities. In general, a catalyst concentration in the range of from about 0.02, and lower, to about 10, and higher, weight percent, based on the weight of total monomeric feed, is suitable. A catalyst concentration in the range of from about 0.1 to about 3 weight percent, based on the weight of total monomeric feed, is preferred. For optimum results, the particular catalyst employed, its preparation, its surface area, the nature of the monomeric reagent(s), the temperature at which the polymerization reaction is conducted, and other factors will largely determine the desired catalyst concentration.

The polymerization reaction can be conducted over a wide temperature range. Depending on various factors such as the nature of the olefin oxide reagent(s) employed, the particular catalyst employed, the concentration of the catalst, and the like, the reaction temperature can be as low as −30° C. and as high as +150° C. A suitable temperature range is from about 0° C. to about 150° C. For the preparation of granular poly(ethylene oxide) synthetically formed as such (which preparation is a highly preferred embodiment and is described hereinafter in detail) a reaction temperature below about 70° C. is suitable. Though granular poly(ethylene oxide) can be prepared at a reaction temperature of about 65°–70° C., the poly(ethylene oxide) product tends to accumulate on the interior surfaces of the reaction equipment. Consequently, it is preferred that the reaction temperature for the preparation of granular poly(ethylene oxide) be in the range of from about −30° to 65° C., and preferably still from about 0° to 60° C. In an extremely desirable aspect the polymerization reaction is conducted below about the softening point of the resulting granular poly(ethylene oxide) product.

In general, the reaction time will vary depending on the operative temperature, the nature of the olefin oxide reagent(s) employed, the particular catalyst and the concentration employed, the surface area of the catalyst employed, the use of an inert diluent, and other factors. The reaction time can be as short as minutes in duration or it can be as long as several days.

When polymerizing an admixture containing two different olefin oxides, the proportions of said olefin oxides can vary over the entire range. Preferably the concentration of either monomeric olefin oxide is in the range of from about 5 to about 95 weight percent, based on the total weight of said olefin oxides.

The polymerization reaction preferably takes place in the liquid phase. Preferably, the polymerization reaction is conducted under an inert atmosphere, e.g., nitrogen. It is also highly desirable to effect the polymerization process under substantially anhydrous conditions. Impurities such as water, aldehyde, carbon dioxide, and oxygen which may be present in the olefin oxide feed and/or reaction equipment should be avoided.

[1] Chem. Revs. 12, 43 (1933); Chem. Revs. 20, 413 (1937).

The polymers of this invention can be prepared via the bulk polymerization, suspension polymerization, or the solution polymerization route. The polymerization reaction can be carried out in the presence of an inert organic diluent such as, for example, aromatic hydrocarbons, e.g., benzene, toluene, xylene, ethylbenzene, chlorobenzene, and the like; various oxygenated organic compounds such as anisole, the dimethyl and diethyl ethers of ethylene glycol, of propylene glycol, of diethylene glycol and the like; normally-liquid saturated hydrocarbons including the open chain, cyclic, and alkyl-substituted cyclic saturated hydrocarbons such as hexane, heptane, various normally-liquid petroleum hydrocarbon fractions, cyclohexane, the alkylcyclohexanes, decahydronaphthalene, and the like.

Unreacted monomeric reagent oftentimes can be recovered from the reaction product by conventional techniques such as by heating said reaction product under reduced pressure. The polymer product also can be recovered from the reaction product by washing said reaction product with an inert, normally-liquid organic diluent, and subsequently drying same under reduced pressure at slightly elevated temperatures. Another route involves dissolution in a first inert organic solvent, followed by the addition of a second inert organic solvent which is miscible with the first solvent but which is a non-solvent for the polymer product, thus precipitating the polymer product. Recovery of the precipitated polymer can be effected by filtration, decantation, etc., followed by drying same as indicated previously. Synthetically formed granular poly(ethylene oxide) can be recovered from the reaction product by filtration, decantation, etc., followed by drying said granular poly(ethylene oxide) under reduced pressure at slightly elevated temperatures, e.g., about 30°–40° C. If desired, the granular poly(ethylene oxide), prior to the drying step, can be washed with an inert, normally-liquid organic diluent in which the granular polymer is insoluble, e.g., heptane, cyclohexane, and the like, and then dried as illustrated above.

As indicated previously a highly preferred embodiment of the instant invention is directed to the preparation of granular poly(ethylene oxide) via the suspension polymerization process. The term "suspension polymerization process," as used herein including the appended claims, refers to polymerization in the presence of an inert, normally-liquid organic diluent in which the monomer employed is soluble and the polymer produced is insoluble. Granular poly(ethylene oxide) results from the suspension polymerization of an agitated reaction mixture comprising ethylene oxide in contact with a catalytic amount of a catalyst previously described, i.e., the metal amides, the suspension polymerization reaction being conducted at a temperature below about the softening point of the resulting granular poly(ethylene oxide) product. A suitable temperature range is from about −30° to +65° C., and preferably from about 0° to 60° C. Agitation of the reaction mixture is necessary in order to maintain catalyst suspended in said reaction mixture during the course of the polymerization reaction.

Unlike the granular poly(ethylene oxide) which directly results from the suspension polymerization route as illustrated above, the bulk or solution polymerization of ethylene oxide yields non-granular, resinous poly(ethylene oxide) which is an entire or substantially an entire polymeric mass, or an agglomerated polymeric mass, or it is dissolved in the inert, organic diluent. It is understood, of course, that the term "bulk polymerization" refers to polymerization in the absence of an inert, normally-liquid organic diluent, and the term "solution polymerization" refers to polymerization in the presence of an inert, normally-liquid organic diluent in which the monomer employed and the polymer produced are soluble.

That granular poly(ethylene oxide) should directly result by effecting the instant invention via the suspension polymerization route was, indeed, highly surprising and unexpected. Synthetically formed granular poly(ethylene oxide) possesses several highly desirable characteristics. One can recover granular poly(ethylene oxide) from the reaction product by the mere technique of decantation or filtration, followed by air-drying at ambient temperature or by drying at slightly elevated temperatures, e.g., 30°–40° C. Further treatment is unnecessary and the granular polymer can be shipped to customers in bags or drums. Poly(ethylene oxide) prepared via the solution polymerization route necessitates the complete removal of the inert organic vehicle at elevated temperatures in order to recover the polymer dissolved in said vehicle. The resulting polymer, of course, is non-granular. Mechanical means, e.g., Marshall Mill, extruding equipment, hammer mill, and the like, are necessary to reduce non-granular, resinous ethylene oxide polymers prepared by the bulk or solution polymerization routes to a particle size which approximately corresponds to the synthetically formed granular poly(ethylene oxide). As is apparent, such mechanical expedients are expensive and time-consuming. Moreover, resinous poly(ethylene oxide) tends to undergo molecular degradation when subjected to a shearing force such as would be produced by the mechanical means illustrated previously.

Many of the fields of applications for ethylene oxide polymers which have a reduced viscosity in acetonitrile above about 1.0 entail solution, oftentimes in water, as an essential step. As is well-known a smaller particle size hastens solution. Thus, it is readily apparent that dissolution of synthetically formed granular poly(ethylene oxide) in liquid media by virtue of its small particle size is enhanced. Furthermore, though dissolution of non-granular, resinous poly(ethylene oxide) prepared via the bulk or solution polymerization routes can be hastened by expedients, for example, high speed stirring, the employment of such techniques results in severe molecular degradation of the relatively high molecular weight polymers.

As previously explained, granular poly(ethylene oxide) which has a reduced viscosity value in acetonitrile of at least 1.0 can be produced via the suspension polymerization route by employing an inert, normally-liquid organic diluent in which the ethylene oxide monomer is soluble and the resulting polymer is insoluble. It is understood, of course, that the diluent employed is non-reactive with ethylene oxide. Illustrative diluents suitable in the suspension polymerization process are the normally-liquid saturated hydrocarbons, e.g., saturated aliphatic hydrocarbons, saturated cycloaliphatic and alkyl-substituted cycloaliphatic hydrocarbons; various normally-liquid saturated ethers; and the like. Example of preferred diluents include, among others, hexane, heptane, isoheptane, ethylpentane, the octanes, the decanes, various petroleum hydrocarbon fractions, cyclohexane, alkyl-substituted cyclohexanes, decahydronaphthalene, and the like. Other illustrative diluents which can be employed include, diethyl, dipropyl, dibutyl, and higher dialkyl ethers; dioxane; the lower glycol dialkyl ethers of diethylene glycol; and the like. It is to be noted that certain of these ether diluents become solvents for the polymer at elevated temperatures. Among such ethers are dioxane, the dimethyl and diethyl ethers of ethylene glycol and of diethylene glycol.

The polymerization process can be carried out in a sealed reaction vessel under the autogenous pressure of the reaction mixture. It is preferred to employ from about 3 to about 400 parts by weight of ethylene oxide per 100 parts by weight of diluent; however, lower or higher proportions of ethylene oxide can also be employed.

A preferred method for producing granular poly(ethylene oxide) is to feed the ethylene oxide into the stirred diluent which contains one of the polymerization catalysts previously described, the reaction temperature being maintained below about the softening point of the resulting granular polymer product, e.g., below about 65°–70° C. When operating in this manner pressure equipment is not necessary. The ethylene oxide is fed into the stirred diluent and unreacted ethylene oxide, if any, is allowed to pass out of the reaction vessel, for example, through a vent, an appropriately adjusted blow-off valve, or other means, as desired. When the process is conducted, for example, under atmospheric pressure at a temperature of about 40° C., the solubility of ethylene oxide in heptane is about 10 parts by weight of ethylene oxide per 100 parts by weight of heptane. The reaction proceeds readily under conditions of pressure and temperature when the concentration of ethylene oxide is about 3 parts by weight of ethylene oxide per 100 parts by weight of diluent. It is highly desirable to conduct the suspension polymerization reaction under a blanket of nitrogen gas, care being taken to exclude oxygen and carbon dioxide. The suspension polymerization can be conducted as a batch, semi-continuous, or a continuous process.

The solid homopolymers prepared in accordance with the teachings of this invention are a useful class of compounds. The ethylene oxide polymers are hard, firm, tough and resinous in character, and they have a reduced viscosity value of from about 1.0 to 60, and higher, in acetonitrile. The ethylene oxide polymers appear to form homogeneous systems with water in all proportions. Although the higher molecular weight ethylene oxide polymers merely swell on the addition of small amounts of water, on the addition of greater amounts of water these polymers pass into solution. The water solutions are viscous, the viscosity increasing both with the concentration of the polymer and the molecular weight of the polymer. The ethylene oxide polymers show little change in melting point with increased molecular weight and the melting point, as measured by change in stiffness with temperature, is found to be about 65°±2° C. throughout the range of reduced viscosity values of from 1 to 60 and greater (in acetonitrile). The crystallization temperature, as determined by measuring the break in the cooling curve, is about 55° C. The ethylene oxide polymers are soluble in water, acetonitrile, chloroform, methanol, and mixtures of water and higher saturated aliphatic alcohols. The ethylene oxide polymers are insoluble in glycerol and normally liquid saturated aliphatic hydrocarbons.

The practice of the instant invention also lends itself to the production of solid homopolymers of other olefin oxides such as, for example, poly(propylene oxide), poly(butylene oxide), poly(pentylene oxide), poly(styrene oxide), and the like.

The copolymers of this invention can be water-soluble or water-insoluble solid compositions depending upon the ratio of the chemically combined monomeric content therein. In general, those copolymers containing a minor proportion, i.e., less than 50 weight percent, of ethylene oxide copolymerized therein are solid water-insoluble compositions. However, it is generally observed that copolymers containing greater than 50 weight percent of ethylene oxide chemically combined in said copolymers, tend to be water-soluble, and this water-soluble characteristic increases as the ethylene oxide content of the resulting copolymer increases. Thus, the instant invention is admirably suited for the preparation of "tailor-made" solid copolymers that have characteristics and properties built into said copolymers which cover a spectrum of properties that are highly desirable in various fields of applications and uses.

The polymers of this invention have a variety of uses. The resinous polymers are useful for the production of various shaped articles, e.g., buttons, brush handles, lamp bases, etc. Resinous ethylene oxide polymers are useful as coagulants and water-soluble lubricants. The water-soluble and water-insoluble solid polymers are also useful in the preparation of films by conventional techniques such as by milling on a two-roll mill, calendering, solvent casting, and the like. The homopolymers of the lower olefin oxides and the copolymers containing a lower olefin oxide as a comonomer are preferred polymeric classes. Those copolymers containing ethylene oxide, and in particular greater than 50 weight percent ethylene oxide, are especially preferred polymeric classes.

The novel granular ethylene oxide polymers are highly useful compounds. These polymers have been termed "synthetically formed granular poly(ethylene oxide)" since they are directly formed or prepared during the suspension polymerization reaction as previously explained. No mechanical or physical treatment is necessary to impart the granular characteristic. The synthetically formed granular poly(ethylene oxide) has a reduced viscosity value in acetonitrile of at least 1.0, preferably at least 30, and upwards to 60, and higher. It has been observed that a major proportion by weight of various samples of synthetically formed granular poly(ethylene oxide) passed through the sieve openings of a No. 8 mesh sieve, U.S. Standard Sieve Series (1940.) In general, greater than 85 weight percent of these synthetically formed granular poly(ethylene oxide) samples passed through the sieve openings of a No. 5 mesh sieve, U.S. Standard Sieve Series (1940.) However, it will be appreciated that different samples of synthetically formed granular poly(ethylene oxide) generally exhibit some variation in the average particle size and/or average surface area (of the granular polymer) since the reaction temperature catalyst, diluent, degree of agitation, etc., employed in the suspension polymerization process can be varied.

Granular ethylene oxide polymers which have a reduced viscosity value in acetonitrile of at least 30 are highly preferred. These polymers have extremely high thickening ability in liquid medium which characteristic makes them admirably suitable in toothpaste, shampoo, shaving cream, etc., applications. These relatively high molecular weight polymers are extremely effective as coagulants and flocculants.

The following examples are illustrative.

EXAMPLE 1

To an autoclave consisting of a 3-liter Pyrex round-bottomed flask with Pyrex pipe flange, a pressure gauge, a relief valve, and a thermowell attached thereto by means of a Teflon[2] gasket and stainless steel flange, there were charged 1,000 grams of dry heptane, 340 cubic centimeters of liquid ethylene oxide, and 4 grams of calcium amide well protected from exposure to the atmosphere. Magnetic stirring was employed. The polymerization reaction was maintained at 25° to 32° C. for a period for 16 hours. The finely-divided polymer was recovered from the reaction product by decantation, followed by drying said polymer under reduced pressure. A 36-gram yield of finely-divided poly(ethylene oxide) which had a reduced viscosity value in acetonitrile of 10.8 was obtained.

EXAMPLE 2

To a 2-liter flask fitted with a mechanical stirrer, a sintered glass gas sparger below the liquid surface, a thermometer, and inlet and outlet gas bubblers, there were charged 1,000 grams of dry heptane and 5 grams of calcium amide protected from exposure to the atmosphere. Gaseous ethylene oxide was then introduced into the flask and the temperature of the resulting reaction mixture was raised to 40° C. Immediately there was an obvious usage of ethylene oxide as shown by the rate of bubbling in the inlet and outlet indicators. The feed rate was adjusted so that no outlet flow was observed. After 10 hours' operation (interrupted by overnight shutdown), the resulting finely-divided polymer was recovered by decanting the heptane and drying said polymer under reduced pressure. The yield of poly(ethylene oxide) was 147 grams; the reduced viscosity value in acetonitrile was 19.0.

EXAMPLE 3

To equipment similar to that employed in Example 2 supra, there were charged one liter of heptane and 1 gram of calcium amide. Vaporous ethylene oxide was sparged into the stirred reaction medium and allowed to bubble off at atmospheric pressure. In this manner the liquid reaction medium was saturated with ethylene oxide throughout the course of the reaction. The reaction temperature was maintained between 65.5° and 72° C. for a period of 3.5 hours. At the end of this period of time finely-divided poly(ethylene oxide) was recovered from the reaction product by filtration and dried under reduced pressure. The yield was 7 grams; the reduced viscosity value in acetonitrile was 8.2.

EXAMPLE 4

To a 2-liter flask there were charged one liter of heptane and 2 grams of calcium amide. The flask and contents were cooled to 5° C. and then ethylene oxide was fed into the stirred reaction medium. The ethylene oxide condensed in the flask. After a period of 4 hours the feed of ethylene oxide was terminated. There were obtained, in the manner explained in Example 3 supra, 8 grams of finely-divided poly(ethylene oxide) which had a reduced viscosity value in acetonitrile of 10.8.

EXAMPLE 5

To a glass tube there were charged 20 grams of ethylene oxide, 5.6 grams of heptane, and 0.4 gram of calcium amide. The tube was sealed and gently rotated at a rate of about 18–20 r.p.m. for a period of 18 hours at room temperature, i.e., 25°–27° C. After this, the tube was broken open and the reaction product was dried under reduced pressure. There was obtained 8 grams of poly(ethylene oxide) which has a reduced viscosity value in acetonitrile of 29.

EXAMPLE 6

To a sealed round-bottomed flask equipped with a thermowell and a magnetic stirrer, there were charged one kilogram of heptane, 333 grams of ethylene oxide, and 4.83 grams of calcium amide. The resulting reaction mixture was stirred for 17 hours without external heating or cooling; the reaction temperature varied from about 16° to 32° C. At the end of this period of time finely-divided poly(ethylene oxide) was recovered from the reaction product by filtration and dried under reduced pressure. The recovered polymer was then exposed to air to decompose any contained catalyst. There was obtained 96 grams of poly(ethylene oxide) which had a reduced viscosity value in acetonitrile of 50.

EXAMPLE 7

Calcium metal (20 grams) was dissolved 1,500 cubic centimeters of distilled liquid ammonia contained in a 3-liter Erlenmeyer flask, said flask being attached to a bubble counter by means of rubber tubing. Gentle agitation was used to facilitate solution. After solution was complete, the Erlenmeyer flask was allowed to stand for approximately 16 hours, until evolution of ammonia and hydrogen had ceased as indicated by cessation of vapor escaping through the bubble counter. The contents of the flask at this stage was in easily fractured lumps; this product was ground to a finely-divided particle state under a nitrogen atmosphere.

EXAMPLE 8

To each of two tubes, there were charged 30 milligrams of calcium amide (prepared as in Example 7 above) and 30 grams of ethylene oxide. Observation indicated that polymer was formed in each of the tubes within moments after the addition of the calcium amide and ethylene oxide thereto. The tubes were rotated at room ---
[2] E. I. du Pont de Nemours and Company trademark for a plastic consisting of tetrafluoroethylene polymer.

temperature and within 16 hours the reaction mass was no longer fluid enough to permit agitation by simple rotation. After an additional four days at room temperature one of the tubes was opened and the polymeric product was recovered. A 20 percent conversion of monomer to polymer was obtained. The poly(ethylene oxide) product had a reduced viscosity value of 61.3. Similar product was found in the second tube.

EXAMPLE 9

Approximately 0.3 gram of strontium amide and 150 cubic centimeters of heptane were charged to a citrate bottle under a nitrogen atmosphere. Ethylene oxide (70 cc.) was charged to the citrate bottle which bottle was then sealed with a polyethylene-lined crown cap immediately after the addition of poly(ethylene oxide) thereto. Polymerization was immediately evident at room temperature. The reduced viscosity value of the resulting poly(ethylene oxide) product in acetonitrile was 1.72.

EXAMPLE 10

Ethylene oxide (30 grams) and zinc amide (0.15 gram) were sealed in a glass tube under a nitrogen atmosphere. The glass tube was then gently agitated for 21 hours at 90° C. Polymerization was evident in less than one hour at the above-said temperature. At the end of 21 hours, the tube was broken open and the resulting polymeric product was recovered therefrom. A 30-gram yield of poly(ethylene oxide) was obtained; this polymer had a reduced viscosity value in acetonitrile of 3.6.

EXAMPLE 11

Calcium amide was prepared by adding 2,000 cc. of liquid ammonia to 100 grams of calcium metal followed by stirring for about 5 minutes. The ammonia was allowed to weather off overnight and the solid product which remained was covered with dry heptane. This mixture was then placed in a stainless steel bucket with some marbles. The bucket was placed on a paint shaker and agitated for one hour until a gray suspension of calcium amide in heptane was obtained. The calcium content of the suspension was determined by titration and found to be one gram of calcium per 24 cc. of suspension.

EXAMPLE 12

To a Pyrex glass tube, there were charged 20 grams of propylene oxide and 6 cc. of the calcium amide suspension (0.25 gram of contained calcium) prepared as set forth in Example 11 above. The tube was then sealed and rotated end over end for 65 hours at room temperature, i.e., approximately 24° C. At the end of this period of time the tube was broken open and the reaction product was washed with about 100 milliliters of hexane and dried under reduced pressure at 30° C. There were obtained 3 grams of a white, solid homopolymer having a reduced viscosity value in benzene of 6.47.

EXAMPLE 13

To a Pyrex glass tube, there were charged 20 grams of 1,2-epoxydodecane and 6 cc. of the calcium amide suspension (0.25 gram of contained calcium) prepared as set forth in Example 11 above. The tube was then sealed and rotated end over end for 65 hours at room temperature, i.e., approximately 24° C. The sealed tube was subsequently inserted into an aluminum block which was gently agitated for a period of 65 hours at 90° C. At the end of this period of time the tube was broken open and the reaction product was washed with about 100 milliliters of hexane and dried under reduced pressure at 30° C. There were obtained 10 grams of a viscous liquid which had a reduced viscosity value in benzene of 0.05.

EXAMPLE 14

To a Pyrex glass tube, there were charged 20 grams of styrene oxide and 6 cc. of the calcium amide suspension (0.25 gram of contained calcium) prepared as set forth in Example 11 above. The tube was then sealed and rotated end over end for 65 hours at room temperature, i.e., approximately 24° C. The sealed tube was subsequently inserted into an aluminum block which was gently agitated for a period 65 hours at 90° C. At the end of this period of time the tube was broken open and the reaction product was washed with about 100 milliliters of hexane and dried under reduced pressure at 30° C. There were obtained 12 grams of a solid, yellow homopolymer which had a reduced viscosity value in benzene of 0.03.

EXAMPLE 15

To a Pyrex glass tube, there were charged 13.5 grams of propylene oxide, 1.5 grams of ethylene oxide, 15 grams of toluene, and 4.8 milliliters of the calcium amide suspension (0.2 gram of contained calcium) prepared as set forth in Example 11 above. The tube was sealed and then inserted into an aluminum block which was gently agitated for a period of 191 hours at 90° C. At the end of this period of time the tube was broken open and the reaction product was washed with about 100 milliliters of hexane and dried under reduced pressure at 30° C. There were obtained 13 grams of soft, solid copolymer which had a reduced viscosity value in benzene of 0.71.

EXAMPLE 16

To a Pyrex glass tube, there were charged 10.5 grams of propylene oxide, 4.5 grams of styrene oxide, 15 grams of toluene, and 4.8 milliliters of the calcium amide suspension (0.2 gram of contained calcium) prepared as in the manner set forth in Example 11 above. The tube was sealed and then inserted into an aluminum block which was gently agitated for a period of 191 hours at 90° C. At the end of this period of time the tube was broken open and the reaction product was washed with about 100 milliliters of hexane and subsequently dried under reduced pressure at 30° C. There were obtained 6.5 grams of a viscous liquid having a reduced viscosity value in benzene of 0.10. This copolymer showed a composition of 27.5 percent styrene oxide as determined by carbon and hydrogen analysis.

EXAMPLE 17

To a Pyrex glass tube, there were charged 9 grams of butylene oxide, 6 grams of ethylene oxide, 15 grams of toluene, and 4.8 milliliters of the calcium amide suspension (0.2 gram of contained calcium) prepared as set forth in Example 11 above. The tube was sealed and then inserted into an aluminum block which was gently agitated for a period of 21.25 hours at 90° C. At the end of this period of time the tube was broken open and the reaction product was washed with about 100 milliliters of hexane, followed by drying under reduced pressure at 30° C. There were obtained 9 grams of a hard, solid copolymer which had a reduced viscosity value in acetonitrile of 3.47. This copolymer showed a composition of 25 percent butylene oxide as determined by carbon and hydrogen analysis.

EXAMPLE 18

Magnesium amide was prepared by slowly adding 200 cc. of ethyl magnesium bromide to a 2-liter beaker containing 600 cc. of diethyl ether under continual stirring. To the resulting solution there were added dropwise 56 grams of 1,4-dioxane over a 15 minute period. A white precipitate formed which was removed via filtration. Additional 1,4-dioxane was added to the filtrate to determine if precipitation was complete. Subsequently, the clear filtrate was added to a flask and ammonia was bubbled through the filtrate for about 2.5 hours. The flask then was stoppered.

EXAMPLE 19

To equipment similar to that employed in Example 2 supra, there were charged one liter of heptane and 100 cc. of the magnesium amide suspension prepared as set forth in Example 18. Gaseous ethylene oxide was sparged into the stirred reaction medium and allowed to bubble off at atmospheric pressure. In this manner the liquid reaction medium was saturated with ethylene oxide throughout the course of the reaction. The reaction temperature was maintained between 24° and 30.5° C. for a period of about 7 hours. At the end of this period finely-divided poly(ethylene oxide) was recovered from the reaction product by filtration and dried under reduced pressure. The yield was 73 grams; the reduced viscosity value in acetonitrile was 18.0.

EXAMPLE 20

To equipment similar to that employed in Example 2 supra, there were charged one liter of heptane and 200 cc. of the magnesium amide suspension prepared as set forth in Example 18. Vaporous ethylene oxide was sparged into the stirred reaction medium and allowed to bubble off at atmospheric pressure. In this manner the liquid reaction medium was saturated with ethylene oxide throughout the course of the reaction. The reaction temperature was maintained between 23° and 38° C. for a period of about 40 hours. At the end of this period finely-divided poly(ethylene oxide) was recovered from the reaction product by filtration and dried under reduced pressure. The yield was 206 grams of granular poly(ethylene oxide) which had a reduced viscosity value of 18.7 in acetonitrile.

EXAMPLE 21

The particle sizes of two samples (designated as Sample A and Sample B) of granular poly(ethylene oxide) prepared by the suspension polymerization route was ascertained as indicated in Tables I and II below. Sample A was prepared by contacting ethylene oxide with calcium amide catalyst in the presence of heptane for a period of 18.5 hours at approximately 20° C. Sample B was prepared by contacting ethylene oxide with calcium amide catalyst in the presence of heptane for a period of about 7 hours at a temperature between 25° and 34° C.

The particle sizes of Sample A and Sample B were determined in accordance with their ability to pass through the sieve or screen openings of various numbered mesh sieves of the U.S. Standard Sieve Series (1940). The results and pertinent data are shown in Tables I and II below.

Table I

| Sieve No. [1] | Sieve Opening [2] | Weight Percent of Sample A Retained |
|---|---|---|
| 5 | 0.157 | 10.5 |
| 8 | 0.0937 | 19.5 |
| 12 | 0.0661 | 18 |
| 20 | 0.0331 | 28 |
| 50 | 0.0117 | 21 |
| 80 | 0.0070 | 3 |

[1] U.S. Standard Sieve Series (1940).
[2] Sieve opening is in inches.

It is readily apparent that 89.5 weight percent of Sample A passed through the sieve openings of a No. 5 mesh sieve. When employing a No. 12 mesh sieve, 52 weight percent of Sample A passed through the sieve openings.

Table II

| Sieve No. [1] | Sieve Opening [2] | Weight Percent of Sample B Retained |
|---|---|---|
| 8 | 0.0937 | 4 |
| 12 | 0.0661 | 4 |
| 20 | 0.0331 | 4 |
| 50 | 0.0117 | 7 |
| 80 | 0.0070 | 37 |
| 200 | 0.0029 | 37 |
| 325 | 0.0017 | 7 |

[1] U.S. Standard Sieve Series (1940).
[2] Sieve opening is in inches.

The data in Table II above discloses that 88 weight percent of Sample B passed through the sieve openings of a No. 20 mesh sieve. When employing a No. 50 mesh sieve only 19 weight percent of Sample B was retained on the sieve.

Although the invention has been illustrated by the preceding examples, the invention is not to be construed as limited to the materials employed in the above exemplary examples, but rather, the invention encompasses the generic area as hereinbefore disclosed. Various modifications and embodiments of this invention can be made without departing from the spirit and scope thereof.

What is claimed is:

1. A process which comprises contacting an olefin oxide having the following formula:

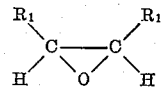

wherein each $R_1$, individually, is selected from the group consisting of hydrogen, haloaryl, a hydrocarbon radical free from ethylenic and acetylenic unsaturation, and a portion of a saturated cycloaliphatic hydrocarbon nucleus which nucleus contains from 4 to 10 carbon atoms including both epoxy carbon atoms shown in the above formula; with from about 0.02 to 10 weight percent, based on the weight of olefin oxide, of divalent metal diamide of the formula $H_2N$—M—$NH_2$, wherein M is a divalent metal which has an atomic number greater than 11 and less than 57 of Group II of the Periodic Table of the Elements, as the sole catalyst therefor; at a temperature in the range of from $-30°$ to $+150°$ C.; and for a period of time sufficient to produce a polymer.

2. A process which comprises contacting an admixture of olefin oxides, said olefin oxides having the following formula:

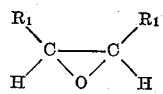

wherein each $R_1$, individually, is selected from the group consisting of hydrogen, haloaryl, a hydrocarbon radical free from ethylenic and acetylenic unsaturation, and a portion of a saturated cycloaliphatic hydrocarbon nucleus which nucleus contains from 4 to 10 carbon atoms including both epoxy carbon atoms shown in the above formula; with from about 0.02 to 10 weight percent, based on the weight of olefin oxides, of a divalent metal diamide of the formula $H_2N$—M—$NH_2$, wherein M is a divalent metal which has an atomic number greater than 11 and less than 57 of Group II of the Periodic Table of the Elements, as the sole catalyst therefor; at a temperature in the range of from $-30°$ to $+150°$ C.; and for a period of time sufficient to produce a copolymer.

3. A process which comprises contacting lower olefin oxide with from about 0.02 to 10 weight percent, based on the weight of lower olefin oxide, of a divalent metal diamide of the formula $H_2N$—M—$NH_2$, wherein M is a divalent metal which has an atomic number greater than 19 and less than 57 of Group II of the Periodic Table of the Elements, as the sole catalyst therefor; at a temperature in the range of from −30° to +150° C.; and for a period of time sufficient to produce a solid polymer.

4. The process of claim 3 wherein said divalent metal diamide is alkaline earth metal diamide.

5. The process of claim 4 wherein said lower olefin oxide is propylene oxide.

6. The process of claim 4 wherein said lower olefin oxide is epoxybutane.

7. The process of claim 4 wherein said lower olefin oxide is styrene oxide.

8. A process which comprises contacting an admixture of ethylene oxide and lower olefin oxide with from about 0.02 to 10 weight percent, based on the weight of ethylene oxide and lower olefin oxide, of a divalent metal diamide of the formula $H_2N-M-NH_2$, wherein M is a divalent metal which has an atomic number greater than 19 and less than 57 of Group II of the Periodic Table of the Elements, as the sole catalyst therefor; at a temperature in the range of from −30° to +150° C.; and for a period of time sufficient to produce a solid copolymer.

9. A process which comprises contacting ethylene oxide with from about 0.1 to 3 weight percent, based on the weight of ethylene oxide, of an alkaline earth metal diamide of the formula $H_2N-M-NH_2$ wherein M is an alkaline earth metal, as the sole catalyst therefor; at a temperature in the range of from −30° to +150° C.; and for a period of time sufficient to produce poly(ethylene oxide) which has a reduced viscosity value of at least above about 1.0 as determined at a concentration of 0.2 gram of said poly(ethylene oxide) in 100 milliliters of acetonitrile at 30° C.

10. A process for producing poly(ethylene oxide) which comprises contacting ethylene oxide with from about 0.02 to 10 weight percent, based on the weight of ethylene oxide, of a divalent metal diamide of the formula $H_2N-M-NH_2$, wherein M is a divalent metal which has an atomic number greater than 19 and less than 57 of Group II of the Periodic Table of the Elements, as the sole catalyst therefor; in the presence of an inert, normally-liquid organic diluent in which said ethylene oxide is soluble and the resulting poly(ethylene oxide) product is insoluble; maintaining the reaction temperature in the range of from −30° to +150° C.; and conducting the polymerization reaction for a period of time sufficient to produce poly(ethylene oxide) which has a reduced viscosity of at least above about 1.0 as determined at a concentration of 0.2 gram of said poly(ethylene oxide) in 100 milliliters of acetonitrile at 30° C.

11. The process of claim 10 wherein the reaction mixture is agitated during the polymerization reaction thus maintaining catalyst suspended in said reaction mixture, and wherein the resulting product is granular poly(ethylene oxide).

12. A process for producing granular poly(ethylene oxide) which comprises contacting ethylene oxide with from about 0.1 to 3 weight percent, based on the weight of ethylene oxide, of an alkaline earth metal diamide of the formula $H_2N-M-NH_2$ wherein M is an alkaline earth metal, as the sole catalyst therefor; in the presence of an inert, normally-liquid organic diluent in which said ethylene oxide is soluble and the resulting granular poly(ethylene oxide) product is insoluble; agitating the reaction mixture to thus maintain catalyst suspended therein while maintaining the reaction temperature in the range of from −30° to +65° C.; and for a period of time sufficient to produce granular poly(ethylene oxide) which has a reduced viscosity of at least above about 1.0 as determined at a concentration of 0.2 gram of said poly(ethylene oxide) in 100 milliliters of acetonitrile at 30° C.

13. The process of claim 12 wherein said alkaline earth metal diamide is calcium diamide.

References Cited in the file of this patent

UNITED STATES PATENTS

| | | |
|---|---|---|
| 1,976,678 | Wittwer | Oct. 9, 1934 |
| 2,706,181 | Pruitt et al. | Apr. 12, 1955 |
| 2,706,182 | Pruitt et al. | Apr. 12, 1955 |
| 2,706,189 | Pruitt et al. | Apr. 12, 1955 |
| 2,870,099 | Barrows et al. | Jan. 20, 1959 |
| 2,870,100 | Stewart et al. | Jan. 20, 1959 |

OTHER REFERENCES

Kraemer: "Advances in Colloid Science," vol. 2, Interscience Pub. Inc., New York, 1946, pp. 211–212.

Marrel: "Synthetic Resins," pp. 530–532, Oxford University Press, 1951.

Staudinger et al.: "Justus Liebig's Annalen der Chemie," vol. 505 (1933), pp. 41–51.

Staudinger: "Hochmolekularen Organisclen Verbindungen," Edwards Brothers, Inc., Ann Arbor, Mich., 1943, pp. 287–332.